US008738054B2

United States Patent
Bultan et al.

(10) Patent No.: US 8,738,054 B2
(45) Date of Patent: *May 27, 2014

(54) EFFICIENT FRAME TRACKING IN MOBILE RECEIVERS

(75) Inventors: Aykut Bultan, Bayside, NY (US); John W. Haim, Baldwin, NY (US); Donald Grieco, Manhasset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1190 days.

This patent is subject to a terminal disclaimer.

(21) Appl. No.: 12/577,431

(22) Filed: Oct. 12, 2009

(65) Prior Publication Data

US 2010/0027526 A1 Feb. 4, 2010

Related U.S. Application Data

(63) Continuation of application No. 11/110,164, filed on Apr. 20, 2005, now Pat. No. 7,603,133, which is a continuation of application No. 10/733,952, filed on Dec. 10, 2003, now Pat. No. 7,006,840.

(60) Provisional application No. 60/507,848, filed on Sep. 30, 2003.

(51) Int. Cl.
*H04B 15/00* (2006.01)

(52) U.S. Cl.
USPC ........... 455/502; 455/334; 370/342; 375/149; 375/150

(58) Field of Classification Search
USPC ............ 455/502, 334; 375/149, 150; 370/342
See application file for complete search history.

(56) References Cited

U.S. PATENT DOCUMENTS

| 5,680,421 | A | 10/1997 | Shiino et al. |
| 5,701,345 | A | 12/1997 | Howlett et al. |
| 6,493,376 | B1 * | 12/2002 | Harms et al. .................. 375/130 |
| 6,556,685 | B1 * | 4/2003 | Urry et al. .................... 381/94.1 |
| 6,650,694 | B1 | 11/2003 | Brown et al. |
| 6,650,698 | B1 | 11/2003 | Liau et al. |
| 2001/0044289 | A1 | 11/2001 | Tsuji et al. |
| 2002/0110185 | A1 | 8/2002 | Ohnishi |
| 2002/0114298 | A1 | 8/2002 | Dotsch et al. |
| 2003/0026363 | A1 * | 2/2003 | Stoter et al. .................. 375/345 |
| 2003/0115007 | A1 | 6/2003 | Lipp |

(Continued)

FOREIGN PATENT DOCUMENTS

| JP | 2003-333011 | 11/2003 |
| WO | 00/64073 | 10/2000 |
| WO | 02/39610 | 5/2002 |
| WO | 2004/073321 | 8/2004 |

*Primary Examiner* — Lewis West
*Assistant Examiner* — Richard Chan
(74) *Attorney, Agent, or Firm* — Volpe and Koenig, P.C.

(57) ABSTRACT

A method for determining the validity of a most significant path in a wireless communication system wherein data is transmitted in frame units in a multipath environment begins by accumulating a correlated data sequence N times, each time at a frame offset apart from the previous time. A preliminary noise estimate (PNE) is calculated as an average of the accumulated data values. A preliminary noise threshold (PNT) is calculated according to the equation $C_1 \times PNE$. A final noise estimate (FNE) is calculated as the average of accumulated data values below the PNT. A final noise threshold (FNT) is calculated according to the equation $C_2 \times FNE$. The validity of the most significant path is determined if the most significant path value is greater than the FNT.

12 Claims, 6 Drawing Sheets

(56) References Cited

U.S. PATENT DOCUMENTS

| | | |
|---|---|---|
| 2003/0142764 A1 | 7/2003 | Keevill et al. |
| 2003/0153360 A1 | 8/2003 | Burke et al. |
| 2003/0179698 A1 | 9/2003 | Lu |
| 2003/0210750 A1 | 11/2003 | Onggosanusi et al. |
| 2004/0057506 A1 | 3/2004 | Bultan et al. |
| 2004/0071198 A1 | 4/2004 | Lomp et al. |
| 2004/0114560 A1 | 6/2004 | Jacobsen |
| 2004/0184570 A1 | 9/2004 | Thomas et al. |
| 2004/0190603 A1 | 9/2004 | Dabak et al. |
| 2004/0252668 A1 | 12/2004 | Ozulturk |
| 2004/0264415 A1 | 12/2004 | Nishio et al. |
| 2007/0149206 A1 * | 6/2007 | Wang et al. .......... 455/450 |

* cited by examiner

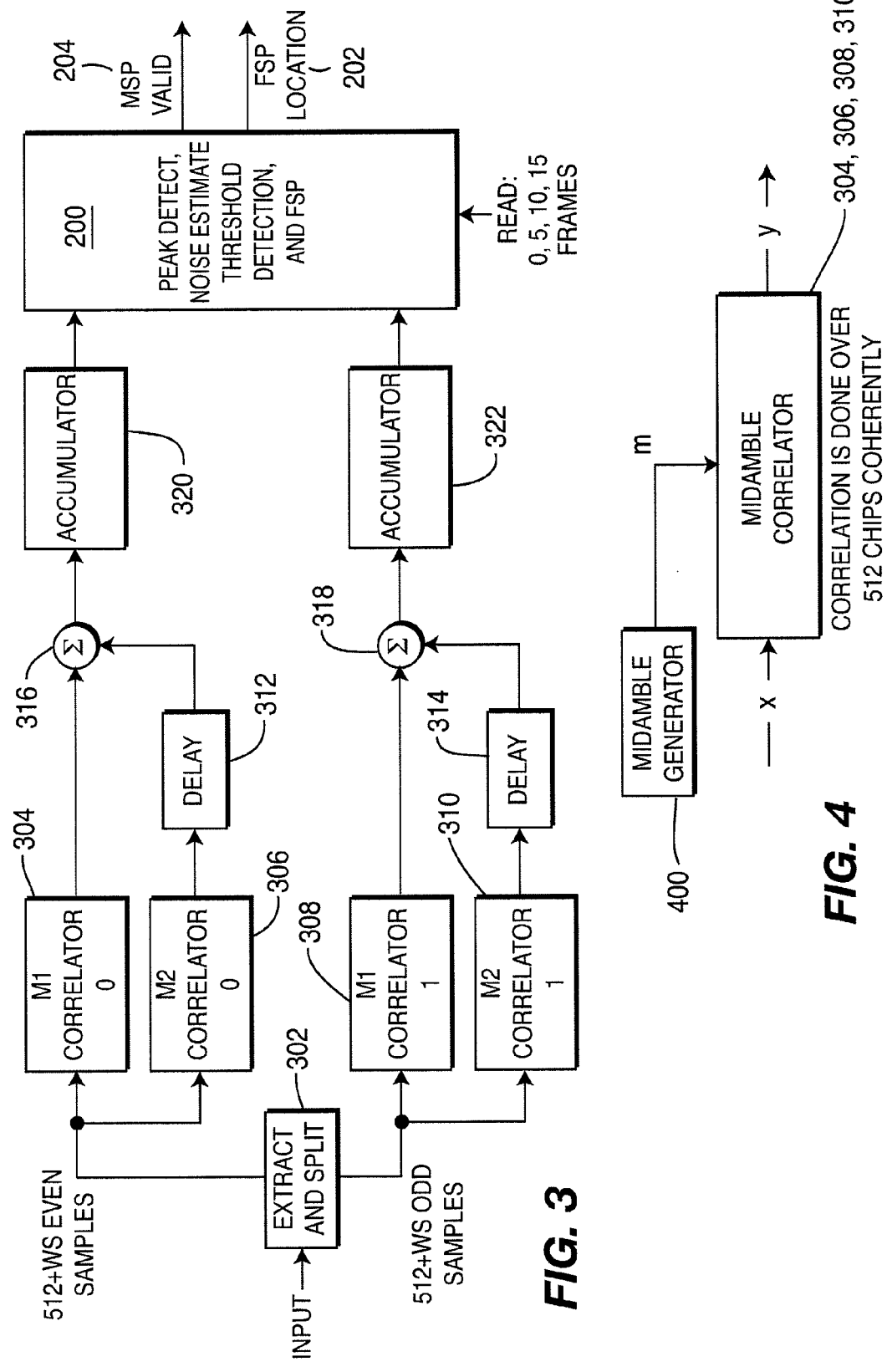

EFFICIENT FRAME TRACKING IN MOBILE RECEIVERS

CROSS REFERENCE TO RELATED APPLICATIONS

This application is a continuation of U.S. patent application Ser. No. 11/110,164 filed Apr. 20, 2005 which is a continuation of U.S. patent application Ser. No. 10/733,952, filed Dec. 10, 2003, issued as U.S. Pat. No. 7,006,840 on Feb. 28, 2006, which claims priority from U.S. Patent Application Ser. No. 60/507,848 filed on Sep. 30, 2003, which are incorporated by reference as if fully set forth herein.

FIELD OF THE INVENTION

The present invention relates generally to channel estimation in wireless communications. More particularly, the invention relates to tracking channel impulse response drifts in time for controlling frame synchronization of received significant paths in a multipath environment by mobile receivers.

BACKGROUND OF THE INVENTION

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a Node B, a site controller, an access point, or other interfacing device in a wireless environment.

Full downlink (DL) synchronization between a base station and a WTRU is obtained when the frame synchronization, code timing, and code locations are synchronized. Frame synchronization defines the beginning of a frame as seen by the WTRU receiver. Code timing is an integer multiple of the sampling period of the received signal in the WTRU receiver front end. Code location is the position of a path or multipath in time as observed by the WTRU receiver. Full synchronization is completed in three stages with three different algorithms: cell search (CS), automatic frequency control (AFC), and frame tracking (FT).

In the first stage, the CS algorithm finds the cell on which the WTRU is camped and performs frame synchronization based on the location of the first significant path (FSP) in the delay spread of a multipath channel. After the CS is completed, AFC commences. The AFC algorithm adjusts the code timing by adjusting the control voltage of the voltage controlled oscillator (VCO). Code timing is initially adjusted and also maintained by the AFC. When AFC is in its converged state (when the VCO operating frequency is adjusted), code locations are found by channel estimation. The output of channel estimation is code locations for every DL slot for the WTRU receiver.

Although CS performs the initial frame synchronization, there is still a need for maintenance of frame synchronization. Frame tracking is one way to maintain the DL frame synchronization of the WTRU. Since the frame synchronization is based on the location of the FSP, the frame tracking procedure is responsible for updating the FSP. The frame tracking procedure will run periodically after the initial frame synchronization.

If the frame tracking procedure does not run periodically, some paths at either end of the channel estimation vector of the WTRU may disappear, resulting in degraded performance due to loss of these paths. There are three main cases that may cause this to happen: WTRU motion, shadowing, and a fading multipath channel.

WTRU motion will result in a time shift of the channel estimation vector to either side depending on the initial and current positions of the WTRU. When the WTRU moves closer to the base station after being initially synchronized to it based on a particular distance, the propagation delay decreases. The FSP then appears earlier in time compared to the initial position. The paths will drift to the left of the channel estimation vector and will eventually disappear. The paths will drift in the opposite direction (i.e., towards the right edge of the channel estimation sequence vector), if the WTRU moves away from the base station. As long as frame synchronization with respect to the FSP position is updated, the channel estimation vector will show the FSP at or near the beginning of the channel estimation vector and all the paths in the delay spread will appear throughout the vector. As an example, for a WTRU radial velocity of 120 km/h, the drift of the FSP will happen very slowly, approximately a one-chip drift in 260 frames at 3.84 Mcps as used for 3GPP W-CDMA.

Multipath channel shadowing is another case where a frame synchronization update is required. During the initial synchronization of the WTRU, an object may block the direct path from the base station to the WTRU. When the blocking object or the WTRU changes position, the direct path may appear earlier than the currently known FSP and even earlier than the channel estimation window. To use this path, an FSP location update is required to provide frame synchronization.

Fading multipath channels are yet another challenge for frame synchronization. CS may not be able to detect the FSP successfully under multipath fading channel conditions. This situation may be avoided by using a longer accumulation period during the initial CS. However, due to a non-synchronized VCO and a limited time budget for initial frame synchronization, a number of frames of accumulations are performed that are insufficient in all cases to successfully find the position of the FSP.

For a multipath fading channel, the channel estimation must find the time locations and complex magnitudes of each path. A channel estimation algorithm should be able to follow the relatively slow and fast varying characteristics of the channel. One example of slowly varying channel characteristics is motion of a WTRU. Also, the difference of the frequencies of the WTRU and the base station local oscillators may result in a drift in the channel impulse response. When these effects are combined, they result in a drift in time in the channel impulse response.

Faster channel characteristic changes are due to the well-known multipath fading phenomena, which quickly makes dramatic changes in the magnitudes of the paths. The motion of the WTRU receiver affects all the paths in a similar manner. However, the multipath fading affects the paths in a unique manner by changing their power levels independently. Conventional channel estimation algorithms do not make use of these differences efficiently. This may result in excessive computations or lack of accuracy.

Multipath fading requires more frequent updates with higher resolution, where the frame of the data is fixed. For example, the commonly used RAKE receiver locates the position of the paths and tracks them individually by assigning a code tracker for each path. Meanwhile, coping with WTRU motion requires signal processing with less frequent updates and with lesser time resolution. These differences in update frequencies and resolutions are a challenge for channel estimation.

SUMMARY OF THE INVENTION

A method for frame tracking of a wireless communication channel is provided which allows signal processing at oversampled transmission rates in a multipath environment. The frame tracking method operates in conjunction with another algorithm to provide the final channel estimates. These channel estimates are useful for a RAKE, an equalizer, or a multi-user detection (MUD) receiver for channel equalization. Frame tracking of a mobile receiver is maintained to counteract motion of the receiver and local oscillator drift. The frame tracking operates on the first significant signal path and updates its position at a relatively slow speed. In response to this, channel estimation of the received multipath signal is enhanced by operating with a fixed short window size, which in turn allows frequent updates of channel estimates. The frame tracking allows all moving paths to remain inside the channel estimation window. As a result, fast changing profiles of the multipath propagation channel are estimated with improved accuracy. Tracking each path is avoided by separating the frame tracking and channel estimation algorithms.

A method for determining the validity of a most significant path in a wireless communication system wherein data is transmitted in frame units in a multipath environment begins by accumulating a correlated data sequence N times, each time at a frame offset apart from the previous time. A preliminary noise estimate (PNE) is calculated as an average of the accumulated data values. A preliminary noise threshold (PNT) is calculated according to the equation C1×PNE. A final noise estimate (FNE) is calculated as the average of accumulated data values below the PNT. A final noise threshold (FNT) is calculated according to the equation C2×FNE. The validity of the most significant path is determined if the most significant path value is greater than the FNT.

An apparatus for use in a wireless communication system includes an extract and split unit for receiving an input signal and splitting the input signal into even samples and odd samples. Two even midamble correlators are used for even sample processing, each even midamble correlator being connected to the extract and split unit. An even sample delay unit is connected to one of the even midamble correlators, and an even correlator adder is connected to the other even midamble correlator and the even sample delay unit. An even sample accumulator is connected to the even correlator adder.

Two odd midamble correlators are used for odd sample processing, each odd midamble correlator being connected to the extract and split unit. An odd sample delay unit is connected to one of the odd midamble correlators. An odd correlator adder is connected to the other odd midamble correlator and the odd sample delay unit. An odd sample accumulator is connected to the odd correlator adder. A frame tracker processor is connected to the even sample accumulator and the odd sample accumulator.

A device for adjusting the timing in a wireless communication system includes a frame tracking processor, a first significant path processor, and timing manager. The frame tracking processor receives a sampled signal as an input and outputs a first significant path location and a most significant path indicator. The first significant path processor receives the first significant path location and the most significant path indicator as inputs and outputs a frame synchronization signal. The timing manager receives the frame synchronization signal as an input, and adjusts the timing of the system based on the value of the frame synchronization signal.

BRIEF DESCRIPTION OF THE DRAWINGS

A more detailed understanding of the invention may be had from the following description of preferred embodiments, given by way of example, and to be understood in conjunction with the accompanying drawings, wherein:

FIG. 3 shows a block diagram of FT procedure elements;

FIG. 4 shows a block diagram of a midamble generator and correlator;

DETAILED DESCRIPTION OF PREFERRED EMBODIMENTS

Although the embodiments are described hereinafter in conjunction with a third generation partnership program (3GPP) wideband code division multiple access (W-CDMA) system utilizing the 3.84 Mcps time division duplex mode (TDD), the embodiments are applicable to any hybrid code division multiple access (CDMA)/time division multiple access (TDMA) communication system, such as TD-SCDMA. Additionally, the embodiments are applicable to CDMA systems, in general, such as the proposed frequency division duplex (FDD) mode of 3GPP W-CDMA or 3GPP2 CDMA 2000.

Frame tracking (FT) is a process to maintain the downlink (DL) frame synchronization of the wireless transmit/receive unit (WTRU). Since frame synchronization is based on the location of the first significant path (FSP), the FT process is responsible for updating the FSP. The FT process will commence after initial cell search (CS) is completed and automatic frequency control (AFC) has converged. Afterwards, it runs periodically.

Figure 1:
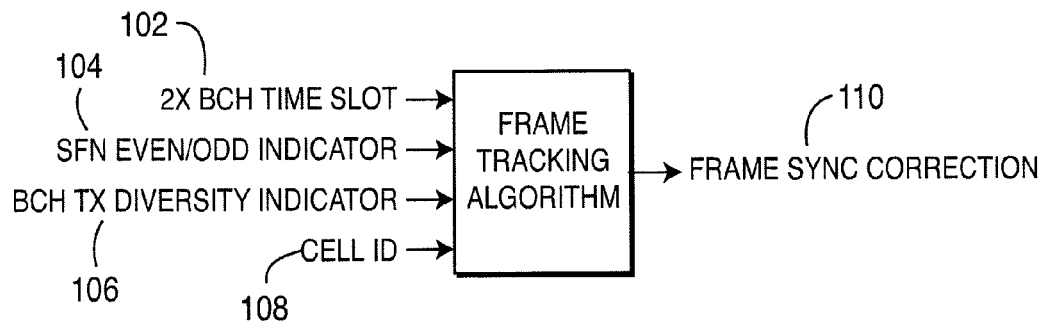
FIG. 1 shows a block diagram of inputs and outputs for a frame tracking (FT) procedure.

FIG. 1 shows a block diagram of input and output signals of a FT process. The data input includes a twice over-sampled broadcast channel (BCH) in time slot intervals 102. Three control signals are also provided as inputs: the system frame number (SFN) even/odd indicator 104, the BCH transmitter time diversity indicator 106, and the identification of the resident base station cell 108. A frame synchronization correction signal 110 is the output of the FT process.

Figure 2:
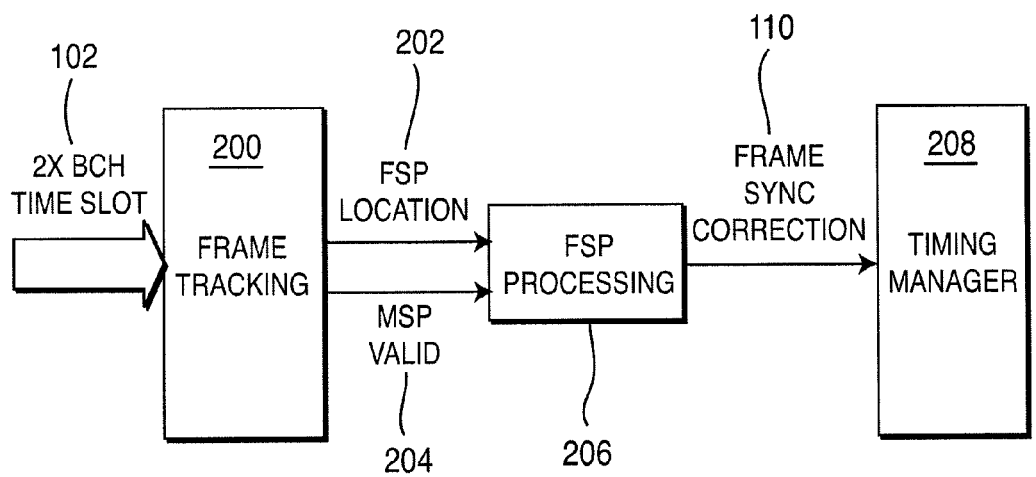
FIG. 2 shows a block diagram of the FT procedure of FIG. 1 in greater detail.

FIG. 2 shows a block diagram of elements used to implement the FT process. A FT processor 200 outputs a location for the FSP 202 and an indicator 204 whether the most significant path (MSP) is valid. An FSP processing portion 206 analyzes the FSP location 202 and the MSP valid indicator 204 to produce the frame synchronization correction signal 110. A timing manager 208 uses the frame synchronization correction signal 110 to adjust the timing of the system.

For example, in a 3GPP TDD system, data extraction from the input data is preferably taken from the midamble position in the BCH timeslot, which is 976 chips or 1952 half-chip complex samples from the beginning of the slot. This midamble section contains the training sequence encoded onto the data, which is useful for channel estimation. Preferably, FT is performed using a window sampling technique. Accordingly, the BCH data input further comprises 2×MWS complex half-chip samples before and after the nominal midamble location, where MWS is the multipath window size. For convenience, these samples may be split into separate even and odd sequences.

FIG. 3 shows a block diagram of the FT process elements, including an extract and split unit 302; two midamble correlators 304, 306 for even sample processing; two midamble correlators 308, 310 for odd sample processing; an even sample delay unit 312; an odd sample delay unit 314; correlator adders 316, 318; an even sample accumulator 320; an odd sample accumulator 322; and the frame tracker processor 200. Each midamble correlator 304, 306, 308, 310 is fed by a midamble generator 400 as shown in FIG. 4. It is noted that one midamble generator 400 could be used, provided that it is time shared among the correlators 304, 306, 308, 310. The midamble generator 400 produces a 512 chip long midamble $m^{(1)}$, and if BCH_tx_diversity is ON, a midamble $m^{(2)}$, based on the basic midamble sequence corresponding to Cell ID, where $m^{(k)}$ represents a basic midamble sequence shifted by k chips.

The position of the FSP is found by performing correlations of the received BCH midamble(s) over different lags. If control signal BCH_tx_diversity is OFF, only midamble $m^{(1)}$ is used; otherwise, both midambles $m^{(1)}$ and $m^{(2)}$ are used. The part of the BCH timeslot from 2×(976−MWS) to 2×(976+MWS) half-chip complex samples is extracted, i.e., the midamble plus 50 earlier and 50 later chips. These samples are split into even and odd sequences for separate processing.

For midamble $m^{(1)}$, there are two correlators 304, 308, one for the even sequence 304, and the other for the odd sequence 308. If midamble $m^{(2)}$ is processed (BCH_tx_diversity is ON), there is an additional pair of correlators 306, 310, as shown in FIG. 3. In each of the two or four correlators, for each of 101 lag positions n, where n varies as −50, −49, . . . +49, +50 chip positions, the correlation is computed as:

$$p_c(n) = \left| \sum_{i=0}^{511} r(i+n+50) m^*(i) \right|, \quad \text{Equation 1}$$

where $p_c(n)$ is the output of correlator c, r(i) is the extracted data of length 612, where 0≤i≤611, and m(i) is the midamble. Note that the output of the correlator is a magnitude, so that further processing of correlator outputs is non-coherent.

Figure 5:
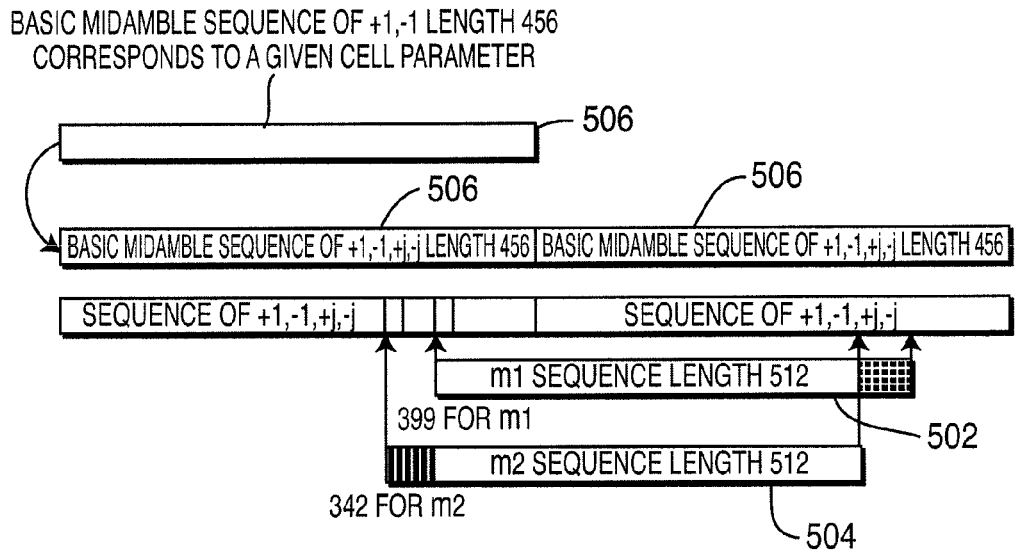
FIG. 5 shows generation of shifted midamble training sequences.

The delay units 312, 314 provide a preferable 57 chip delay between midamble $m^{(1)}$ and midamble $m^{(2)}$. The delay corresponds to the sequence shift between the two midambles. FIG. 5 shows midamble sequences $m^{(1)}$ 502 and $m^{(2)}$ 504 in relation to the basic midamble sequence 506 of length 456. Using a 57 chip delay as an example, with BCH_tx_diversity ON, elements −50 thru −7 of the output vectors of the even and odd $m^{(2)}$ correlators 306, 310 are added to elements 7 thru 50 of the output vectors of the even and odd $m^{(1)}$ correlators 304, 308, respectively. This is equivalent to adding a 57-element delayed version of $m^{(2)}$ correlator output vector to an $m^{(1)}$ correlator output vector.

The two correlator outputs, or summed output vectors for the case of BCH_tx_diversity ON, are computed four times, each time five frames apart. These outputs are accumulated over this period by accumulators 320, 322 as follows:

$$A_c(n) = \sum_{i=1}^{4} p_c^{(i)}(n), \quad \text{Equation 2}$$

where $p^{(i)}c(n)$ is the output vector of correlator c for the $i^{th}$ computation, for the n range −50≤n≤+50. The accumulators 320, 322 are reset after frame tracking value Frame_Sync_Correction 110 is computed. The elements of FIGS. 1-4 can be implemented on a single integrated circuit (IC), multiple ICs, as discrete components, or as a combination of these.

Figure 6:
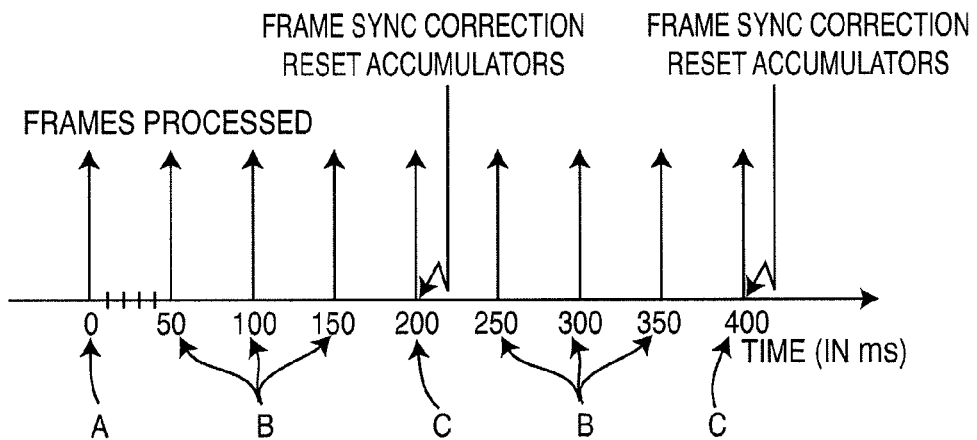
FIG. 6 shows a processing timeline of the FT procedure in accordance with the present invention.

FIG. 6 shows a timing diagram for the FT processing. The FT process begins working after initial cell search is completed and AFC comes to steady state (point A). Afterwards, FT reads and performs correlations of the BCH timeslot every five frames (point B), which equals every 50 ms for preferable frame size of 10 ms. After the fourth BCH is processed (point C), the frame tracking correction value 110 is computed and applied for the frame of the next read BCH timeslot.

Figure 7A:
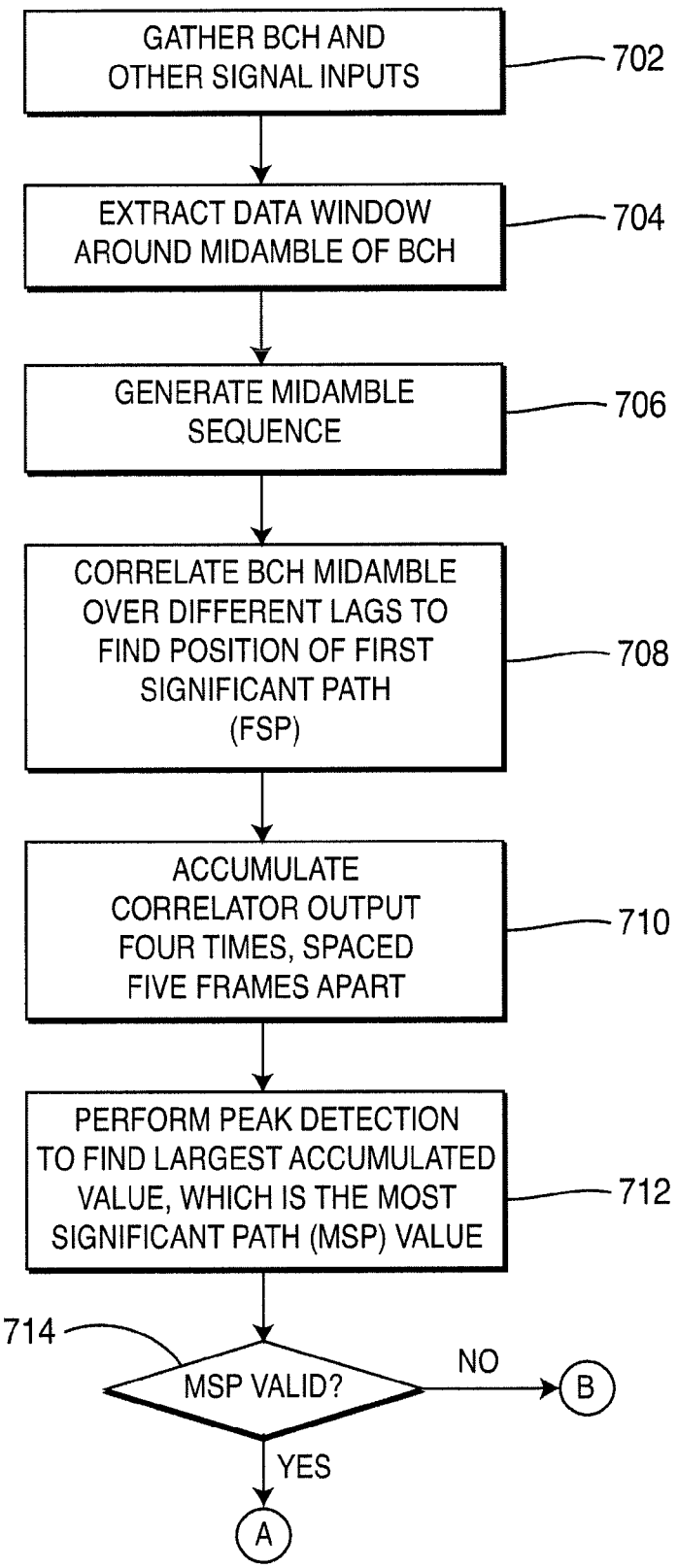
FIGS. 7A-7C are flowcharts showing operation of the FT procedure in accordance with the present invention.
Figure 7B:
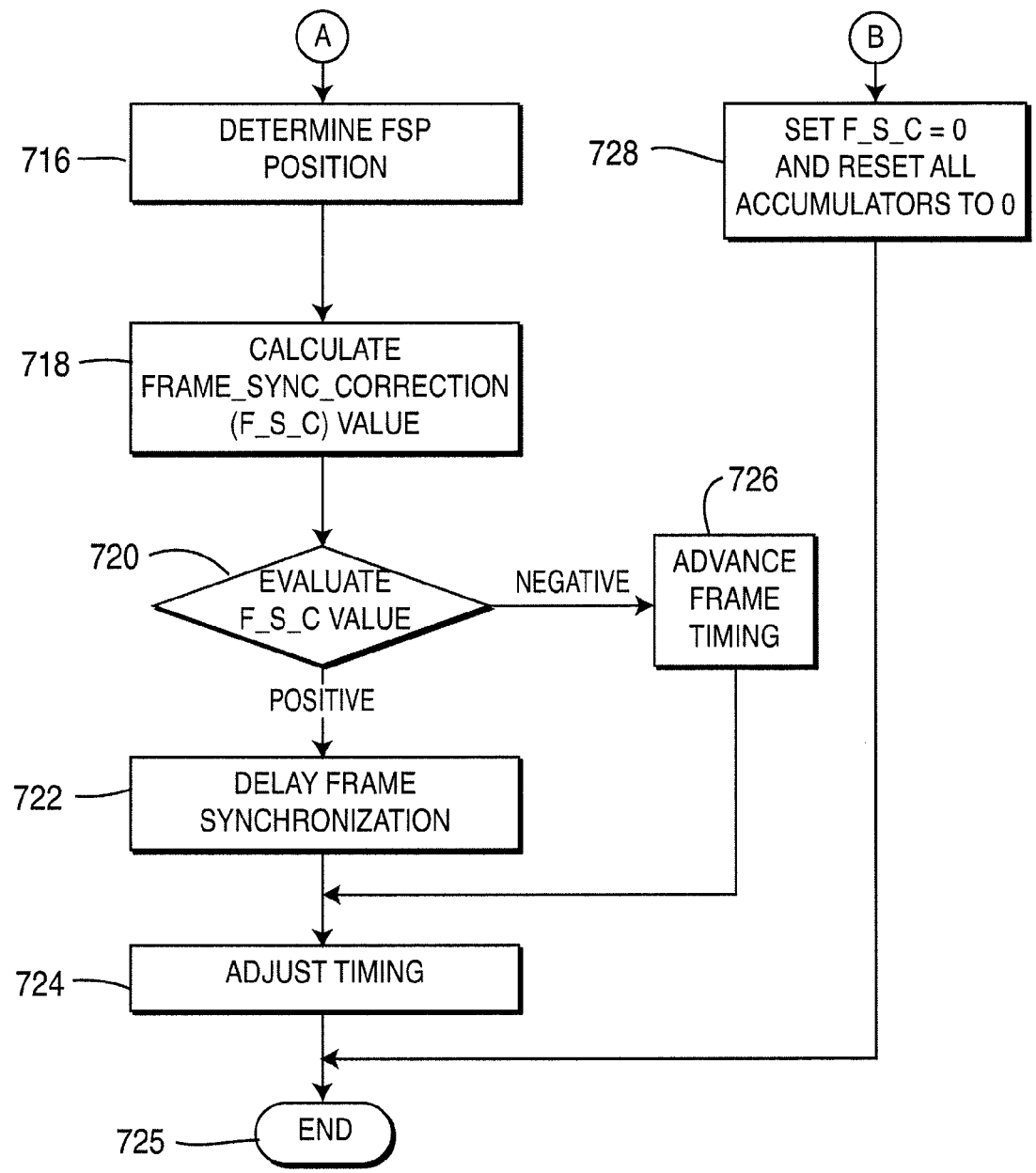

FIGS. 7A and 7B show a flowchart of a frame tracking procedure 700 in accordance with the present invention. The procedure 700 begins by gathering the BCH and the other signal inputs (step 702). A data window is extracted around the midamble of the BCH (step 704) and a midamble sequence is generated (step 706). The BCH midamble is correlated over different lags to find the position of the FSP (step 708). The correlator output is accumulated four times, spaced five frames apart (step 710). Steps 702-710 have been described in greater detail above in connection with FIGS. 1-6.

After accumulating four times, the FT processor performs peak detection, in which the process finds the element containing the largest value among the two accumulator vectors. The identified largest value is the most significant path (MSP) value (step 712). The position of the MSP value is the MSP position and the accumulator that contains the MSP is the MSP accumulator.

Figure 7C:
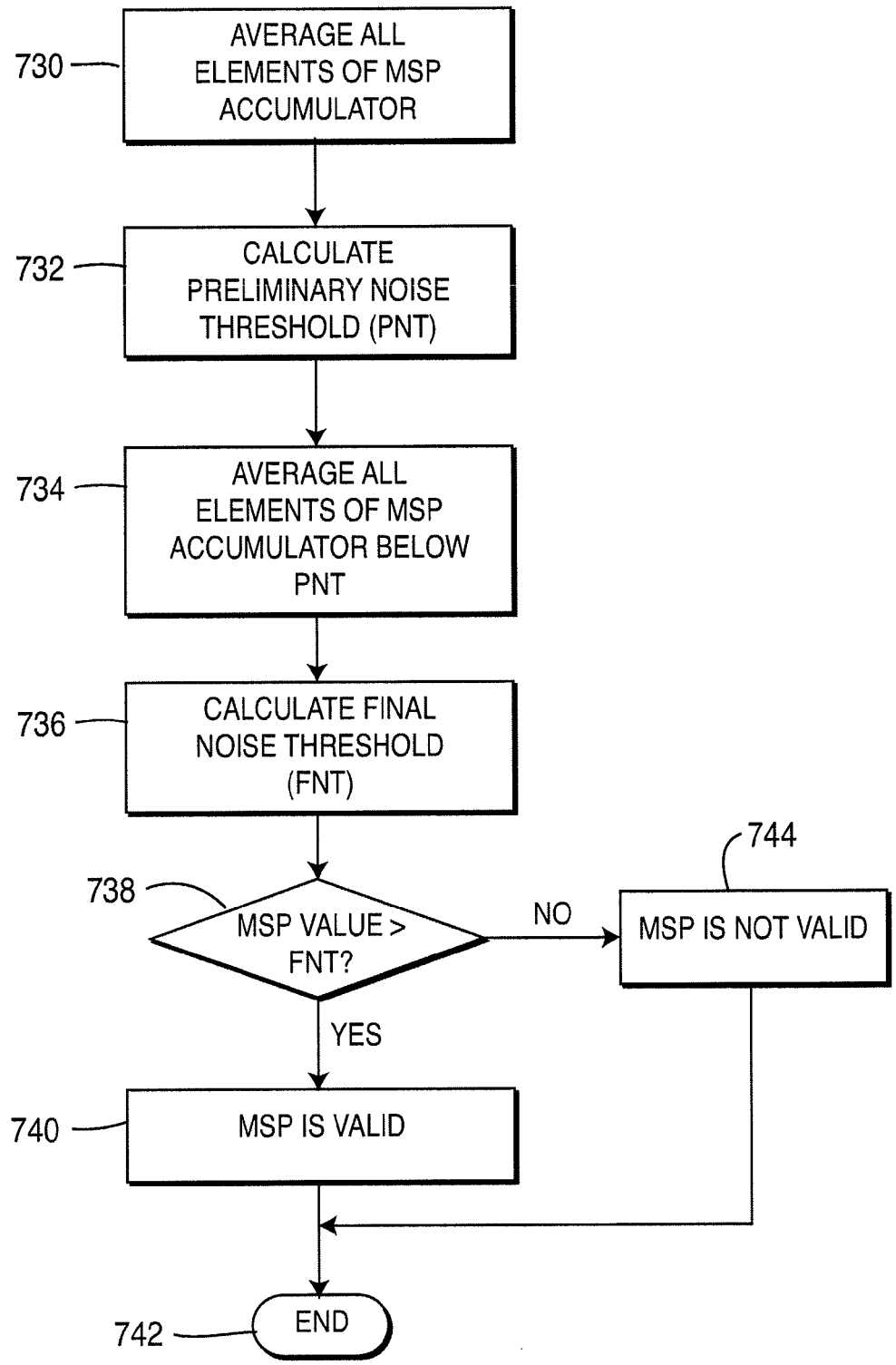

The validity of the MSP, i.e., when the SNR of the accumulator output is strong enough to assume that a valid path has been identified, is determined (step 714) as follows and as shown in FIG. 7C. An estimate of the noise power is obtained, for example, using the following two step procedure. First, the preliminary noise estimate (PNE) is the average of all elements of the MSP accumulator (step 730). The preliminary noise threshold is C1×PNE (step 732); a preferred value for $C_1$ is 1.5. Second, the final noise estimate (FNE) is the average of all elements in the MSP accumulator below the preliminary threshold (step 734).

The final noise threshold is determined by $C_2$×FNE if control signal BCH_tx_diversity is OFF or $C_3$×FNE if it is ON (step 736); a preferred value for $C_2$ is 1.83 and a preferred value for $C_3$ is 2.2. If the MSP value is above the final noise threshold (step 738), then control signal MSP_valid is ON (step 740) and the method terminates (step 742). If the MSP value is below the final noise threshold (step 738), then the MSP_valid control signal is OFF (step 744) and the method terminates (step 742).

Referring back to FIGS. 7A and 7B, detection of the FSP involves examining the status of control signal MSP_valid (step 714). If control signal MSP_valid is ON, starting from the earliest (−50) position, elements of both even and odd accumulators 320, 322 are checked against the final noise threshold. The first position that has a value above the final noise threshold is selected as the FSP position (step 716).

Next, FSP processing is performed as follows. The frame tracking value Frame_Sync_Correction 110 is computed (step 718) as:

Frame_Sync_Correction=FSP position−Frame Offset    Equation 3

If the magnitude of Frame_Sync_Correction is greater than a predetermined maximum frame sync correction value, Smax, it is limited to ±Smax, which is preferably in a range from six to ten chips (step 720). A positive value of Frame_Sync_Correction indicates that frame synchronization should be delayed, i.e., the FSP was detected later than expected (step 722). The timing is adjusted (step 724) and the method terminates (step 725). A negative value of Frame_Sync_Correction indicates that frame timing should be advanced, i.e., the FSP was detected earlier than expected (step 726). The timing is adjusted (step 724) and the method terminates (step 725).

If the signal MSP_valid is OFF (step 714), then the value of Frame_Sync_Correction is set to zero and all accumulators are reset to zero (step 728). The method then terminates (step 725).

Following the computation of correlations for relative frame 15 of the BCH, for purposes of this process, the value of Frame_Sync_Correction can be computed and applied anywhere in the interval of relative frames 16-20. However, to synchronize with receive signal code power (RSCP) measurements, it is preferable to apply the Frame_Sync_Correction value at the start of relative frame 20.

Although the invention has been described as having to perform accumulations preferably four times according to Equation 3, reading the frame numbers in preferred increments of five, and using a preferred frame offset of five, these values are not intended to be limiting, and can be adjusted to suit the needs of the operating system.

While specific embodiments of the present invention have been shown and described, many modifications and variations could be made by one skilled in the art without departing from the scope of the invention. The above description serves to illustrate and not limit the particular invention in any way.

What is claimed is:

1. A method to adjust timing for frame synchronization in wireless communications, the method comprising:
    receiving a most significant path (MSP) validation value wherein the MSP validation value is based an accumulation of received signals and whether the accumulated signals exceed a final noise threshold (FNT), wherein the MSP validation is ON on a condition that the accumulated signals exceed the FNT, and the MSP validation value is OFF on a condition that the accumulated signals do not exceed the FNT;
    comparing the accumulated signals beginning at an earliest lag position before a broadcast channel (BCH) midamble to the FNT;
    determining a first significant path (FSP) as a first position in which the accumulated signal exceeds the FNT;
    computing a frame synchronization correction value on a condition that the MSP validation value is ON, based on the correction value equal to a difference between the FSP position and a frame offset;
    adjusting frame timing, wherein timing is advanced on a condition that the frame synchronization correction value is negative and the timing is delayed on a condition that the frame synchronization value is positive.

2. The method of claim 1, wherein the frame synchronization correction value is limited to a predetermined maximum value, $\pm S_{max}$.

3. The method of claim 2, wherein the value of $S_{max}$ is a range of 6 to 10 chips.

4. The method of claim 1, further comprising:
    setting the frame synchronization correction value to a value of zero on a condition that the MSP validation value is OFF.

5. A wireless transmit/receive unit (WTRU) configured to adjust timing for frame synchronization in wireless communications, the WTRU comprising:
    a frame tracking processor configured to receive a most significant path (MSP) validation value wherein the MSP validation value is based an accumulation of received signals and whether the accumulated signals exceed a final noise threshold (FNT), wherein the MSP validation is ON on a condition that the accumulated signals exceed the FNT, and the MSP validation value is OFF on a condition that the accumulated signals do not exceed the FNT;
    the frame tracking processor configured to compare the accumulated signals beginning at an earliest lag position before a broadcast channel (BCH) midamble to the FNT;
    the frame tracking processor configured to determine a first significant path (FSP) as a first position in which the accumulated signal exceeds the FNT; and
    the frame tracking processor configured to compute a frame synchronization correction value on a condition that the MSP validation value is ON, based on the correction value equal to a difference between the FSP position and a frame offset;
    wherein the WTRU is configured to adjust frame timing, wherein timing is advanced on a condition that the frame synchronization correction value is negative and the timing is delayed on a condition that the frame synchronization value is positive.

6. The WTRU of claim 5, wherein the frame synchronization correction value is limited to a predetermined maximum value, $\pm S_{max}$.

7. The WTRU of claim 6, wherein the value of $S_{max}$ is a range of 6 to 10 chips.

8. The WTRU of claim 5, wherein the frame tracking processor is further configured to set the frame synchronization correction value to a value of zero on a condition that the MSP validation value is OFF.

9. An integrated circuit configured to adjust timing for frame synchronization in wireless communications, the integrated circuit comprising:
    a frame tracking processor configured to receive a most significant path (MSP) validation value wherein the MSP validation value is based an accumulation of received signals and whether the accumulated signals exceed a final noise threshold (FNT), wherein the MSP validation is ON on a condition that the accumulated signals exceed the FNT, and the MSP validation value is OFF on a condition that the accumulated signals do not exceed the FNT;
    the frame tracking processor configured to compare the accumulated signals beginning at an earliest lag position before a broadcast channel (BCH) midamble to the FNT;
    the frame tracking processor configured to determine a first significant path (FSP) as a first position in which the accumulated signal exceeds the FNT; and
    the frame tracking processor configured to compute a frame synchronization correction value on a condition that the MSP validation value is ON, based on the correction value equal to a difference between the FSP position and a frame offset;
    wherein the integrated circuit is configured to adjust frame timing, wherein timing is advanced on a condition that the frame synchronization correction value is negative and the timing is delayed on a condition that the frame synchronization value is positive.

10. The integrated circuit of claim 9, wherein the frame synchronization correction value is limited to a predetermined maximum value, $\pm S_{max}$.

11. The integrated circuit of claim 10, wherein the value of $S_{max}$ is a range of 6 to 10 chips.

12. The integrated circuit of claim 9, wherein the frame tracking processor is further configured to set the frame synchronization correction value to a value of zero on a condition that the MSP validation value is OFF.

* * * * *